US012585986B2

(12) United States Patent　　(10) Patent No.: US 12,585,986 B2
Norrman et al.　　(45) Date of Patent:　Mar. 24, 2026

(54) METHODS, APPARATUS AND MACHINE-READABLE MEDIA RELATING TO MACHINE-LEARNING IN A COMMUNICATION NETWORK

(71) Applicant: Telefonaktiebolaget LM Ericsson (publ), Stockholm (SE)

(72) Inventors: Karl Norrman, Stockholm (SE); Martin Isaksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1075 days.

(21) Appl. No.: 17/635,405

(22) PCT Filed: Aug. 6, 2020

(86) PCT No.: PCT/EP2020/072120
§ 371 (c)(1),
(2) Date: Feb. 15, 2022

(87) PCT Pub. No.: WO2021/032496
PCT Pub. Date: Feb. 25, 2021

(65) Prior Publication Data
US 2022/0292398 A1　Sep. 15, 2022

Related U.S. Application Data

(60) Provisional application No. 62/887,851, filed on Aug. 16, 2019.

(51) Int. Cl.
*G06N 20/00*　　(2019.01)

(52) U.S. Cl.
CPC ................................... *G06N 20/00* (2019.01)

(58) Field of Classification Search
CPC ....................................................... G06N 20/00
(Continued)

(56) References Cited

U.S. PATENT DOCUMENTS

| | | | |
|---|---|---|---|
| 2018/0365253 A1* | 12/2018 | Francis | G06F 16/9535 |
| 2020/0127907 A1* | 4/2020 | Koo | H04W 24/02 |
| 2020/0364571 A1 | 11/2020 | Xu et al. | |

FOREIGN PATENT DOCUMENTS

| | | |
|---|---|---|
| CN | 110119808 A | 8/2019 |
| WO | WO 2018057302 A1 | 3/2018 |

OTHER PUBLICATIONS

Li et al., "Communication efficient distributed machine learning with the parameter server", Advances in Neural Information Processing, NIPS2014, 2014 (Year: 2014).*

(Continued)

*Primary Examiner* — Tsu-Chang Lee
(74) *Attorney, Agent, or Firm* — Sage Patent Group

(57)　　ABSTRACT

A method performed by a first network entity in a communications network includes training a model to obtain a local model update including an update to values of one or more parameters of the model, in which training the model includes inputting training data into a machine learning algorithm. The method further includes applying a serialisation function to the local model update to construct a serial representation of the local model update, thereby removing information indicative of a structure of the model, and transmitting the serial representation of the local model update to an aggregator entity in the communications network.

20 Claims, 9 Drawing Sheets

(58) Field of Classification Search
USPC ............................................................ 706/12
See application file for complete search history.

(56)                    References Cited

OTHER PUBLICATIONS

International Search Report and Written Opinion of the International Searching Authority, PCT/EP2020/072120, mailed Nov. 6, 2020, 18 pages.
Bonawitz, Keith et al., "Towards Federated Learning at Scale: System Design," Proceedings of the 2nd SysML Conference, Palo Alto, CA, USA, 2019, 15 pages.
Hardy, Corentin et al., "Distributed deep learning on edge-devices: feasibility via adaptive compression," 2017 IEEE 16th International Symposium on Network Computing and Applications (NCA), 2017, 9 pages.

Mcmahan, H. Brendan et al., "Communication-Efficient Learning of Deep Networks from Decentralized Data," Proceedings of the 20th International Conference on Artificial Intelligence and Statistics (AISTATS) 2017, Fort Lauderdale, Florida, USA, 11 pages.
3rd Generation Partnership Project, 3GPP TS 23.288 v0.4.0 (Apr. 2019), Technical Specification Group Services and System Aspects; Architecture enhancement for 5G System (5GS) to support network data analytics services (Release 16), 52 pages.
3rd Generation Partnership Project, 3GPP TR 23.791 v16.1.0 (Mar. 2019), Technical Specification Group Services and System Aspects; Study of Enablers for Network Automation for 5G (Release 16), 124 pages.
3rd Generation Partnership Project, 3GPP TS 23.288 v16.0.0 (Jun. 2019), Technical Specification Group Services and System Aspects; Architecture enhancement for 5G System (5GS) to support network data analytics services (Release 16), 52 pages.
3rd Generation Partnership Project, 3GPP 23.502 v16.0.2 (Apr. 2019), Technical Specification Group Services and System Aspects; Procedures for the 5G System; Stage 2 (Release 16), 419 pages.

* cited by examiner

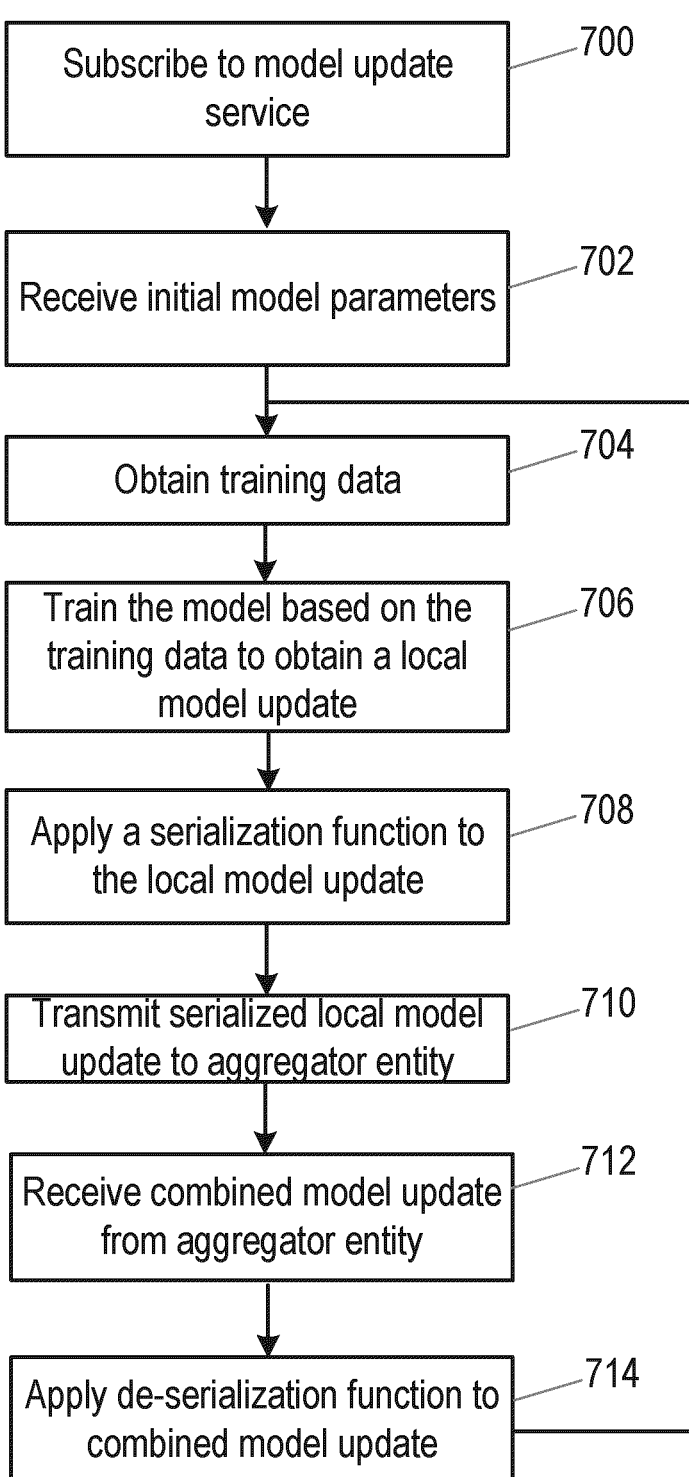

Subscribe to model update service — 700

Receive initial model parameters — 702

Obtain training data — 704

Train the model based on the training data to obtain a local model update — 706

Apply a serialization function to the local model update — 708

Transmit serialized local model update to aggregator entity — 710

Receive combined model update from aggregator entity — 712

Apply de-serialization function to combined model update — 714

METHODS, APPARATUS AND MACHINE-READABLE MEDIA RELATING TO MACHINE-LEARNING IN A COMMUNICATION NETWORK

CROSS REFERENCE TO RELATED APPLICATIONS

This application is a 35 U.S.C. § 371 national stage application of PCT International Application No. PCT/EP2020/072120 filed on Aug. 6, 2020, which in turn claims domestic priority to U.S. Provisional Patent Application No. 62/887,851, filed on Aug. 16, 2019, the disclosures and content of which are incorporated by reference herein in their entirety.

TECHNICAL FIELD

Embodiments of the disclosure relate to machine learning, and particularly to methods, apparatus and machine-readable media relating to machine-learning in a communication network.

BACKGROUND

In a typical wireless communication network, wireless devices are connected to a core network via a radio access network. In a fifth generation (5G) wireless communication network, the core network operates according to a Service Based Architecture (SBA), in which services are provided by network functions via defined application interfaces (APIs). Network functions in the core network use a common protocol framework based on Hypertext Transfer Protocol 2 (HTTP/2). As well as providing services, a network function can also invoke services in other network functions through these APIs. Examples of core network functions in the 5G architecture include the Access and mobility Management Function (AMF), Authentication Server Function (AUSF), Session Management Function (SMF), Policy Charging Function (PCF), Unified Data Management (UDM) and Operations, Administration and Management (OAM). For example, an AMF may request subscriber authentication data from an AUSF by calling a function in the API of an AUSF for this purpose.

Efforts are being made to automate 5G networks, with the aim of providing fully automated wireless communication networks with zero touch (i.e. networks that require as little human intervention during operation as possible). One way of achieving this is to use the vast amounts of data collected in wireless communication networks in combination with machine-learning algorithms to develop models for use in providing network services.

A Network Data Analytics (NWDA) framework has been established for defining the mechanisms and associated functions for data collection in 5G networks. Further enhancements to this framework are described in the 3GPP document TS 23.288 v 16.0.0. The NWDA framework is centred on a Network Data Analytics Function (NWDAF) that collects data from other network functions in the network. The NWDAF also provides services to service consumers (e.g. other network functions). The services include, for example, retrieving data or making predictions based on data collated at the NWDAF.

FIG. 1 shows an NWDAF 102 connected to a network function (NF) 104. As illustrated, the network function 104 may be any suitable network function (e.g. an AMF, an AUSF or any other network function). Here we note that the term "network function" is not restricted to core network functions, and may additionally relate to functions or entities in the radio access network or other parts of the communication network. In order to collect data from the network function 104, the NWDAF 102 connects to an Event Exposure Function at the network function over an Nnf reference point (as detailed in the 3GPP documents TS 23.502 v 16.0.2 and TS 23.288, v 16.0.0). The NWDAF 102 can then receive data from the network function over the Nnf reference point by subscribing to reports from the network function or by requesting data from the network function. The timing of any reports may be determined by timeouts (e.g. expiry of a timer) or may be triggered by events (e.g. receipt of a request). The types of data that can be requested by the NWDAF 102 from the network function may be standardised.

FIG. 2 shows an NWDAF 204 connected to a NWDAF Service Consumer 202. The NWDAF 204 exposes information relating to the collected data over the Nnwdaf reference point. Thus the NWDAF Service Consumer 202 (which may be any network function or entity authorised to access the data) subscribes to receive analytics information or data from the NWDAF 204 and this is acknowledged. Thereafter, the NWDAF 204 may transmit or expose reports on collected data to the NWDAF Service Consumer 202. The timing of any reports may again be determined by timeouts (e.g. expiry of a timer) or may be triggered by events (e.g. receipt of a request). The NWDAF Service Consumer 202 may similar unsubscribe from the analytics information.

As noted above, data collection has the potential to be a powerful tool for 5G networks when coupled with machine-learning. Machine-learning in the context of 5G networks is large-scale and may be executed in a cloud (virtualised) environment where performance and security are prioritised. In practice, this means that the data available for training models using machine-learning may be distributed across many entities in the network, which means that data should ideally be collated at one network entity to be used for developing models using machine-learning. Collating these datasets at a single network entity can be slow and resource intensive, which is problematic for time-critical applications. In addition, some applications require the use of datasets comprising sensitive or private data, and collating these data at a single network entity may have security implications.

SUMMARY

Embodiments of the disclosure address these and other problems.

In one aspect, the disclosure provides a method performed by an aggregating entity in a communications network. The communication network further comprises a plurality of network entities configured to perform collaborative learning to develop a model, each network entity of the plurality of network entities storing a version of the model, and training the version of the model using a machine learning algorithm. The method comprises: receiving, from each network entity in a plurality of network entities, a serial representation of a respective local model update comprising an update to values of one or more parameters of the model, wherein the serial representation lacks any information relating to a structure of the model; and combining the local model updates received from the plurality of network entities to obtain a combined model update.

In further aspect, the disclosure provides an aggregating entity to perform the method recited above. A further aspect provides a computer program for performing the method recited above. A computer program product, comprising the computer program, is also provided.

In another aspect, a method is provided performed by a first network entity in a communications network. The method comprises: training a model to obtain a local model update comprising an update to values of one or more parameters of the model, wherein training the model comprises inputting training data into a machine learning algorithm; applying a serialisation function to the local model update to construct a serial representation of the local model update, thereby removing information indicative of a structure of the model; and transmitting the serial representation of the local model update to an aggregator entity in the communications network.

In further aspect, the disclosure provides a first network entity to perform the method recited above. A further aspect provides a computer program for performing the method recited above. A computer program product, comprising the computer program, is also provided.

Another aspect provides an aggregating entity for a communications network. The communication network further comprises a plurality of network entities configured to perform collaborative learning to develop a model, each network entity of the plurality of network entities storing a version of the model, and training the version of the model using a machine learning algorithm. The aggregating entity comprises processing circuitry and a machine-readable medium storing instructions which, when executed by the processing circuitry, cause the aggregating entity to: receive, from each network entity in a plurality of network entities, a serial representation of a respective local model update comprising an update to values of one or more parameters of the model, wherein the serial representation lacks any information relating to a structure of the model; and combine the local model updates received from the plurality of network entities to obtain a combined model update.

Another aspect provides a first network entity for a communications network. The first network entity comprises processing circuitry and a non-transitory machine-readable medium storing instructions which, when executed by the processing circuitry, cause the first network entity to: train a model to obtain a local model update comprising an update to values of one or more parameters of the model, wherein training the model comprises inputting training data into a machine learning algorithm; apply a serialisation function to the local model update to construct a serial representation of the local model update, thereby removing information indicative of a structure of the model; and transmit the serial representation of the local model update to an aggregator entity in the communications network.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 7 is a flowchart of a method according to further embodiments of the disclosure;

DETAILED DESCRIPTION

Embodiments of the disclosure provide methods, apparatus, and machine-readable media for training a model using a machine-learning algorithm. In particular, embodiments of the disclosure relate to collaborative learning between one or more network entities. In particular embodiments, the concept of federated learning is utilized, in which a plurality of network entities train a model based on data samples which are local to the network entities. Thus each network entity generates a respective update to the model, and shares that update with a central, aggregating entity which combines the updates from multiple network entities to formulate an overall updated model. The overall updated model may then be shared with the plurality of network entities for further training and/or implementation. This mechanism has advantages in that the local data (on which each network entity performs training) is not shared with the aggregating entity over the network and thus data privacy is ensured.

Figure 1:
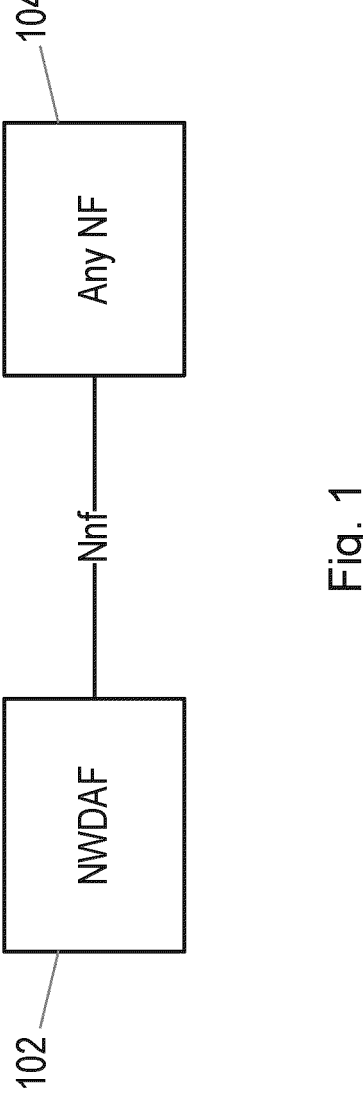
FIG. 1 shows collection of data from network functions.
Figure 2:
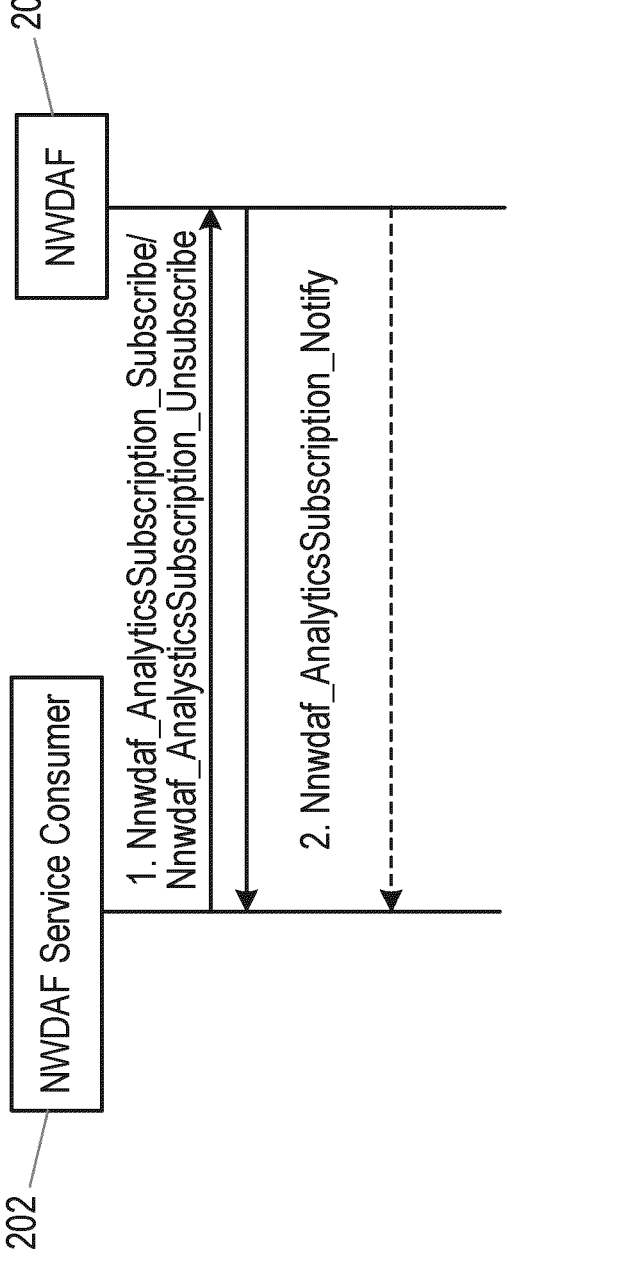
FIG. 2 shows an example of signalling between an NWDAF and a NWDAF Service Consumer.
Figure 3:
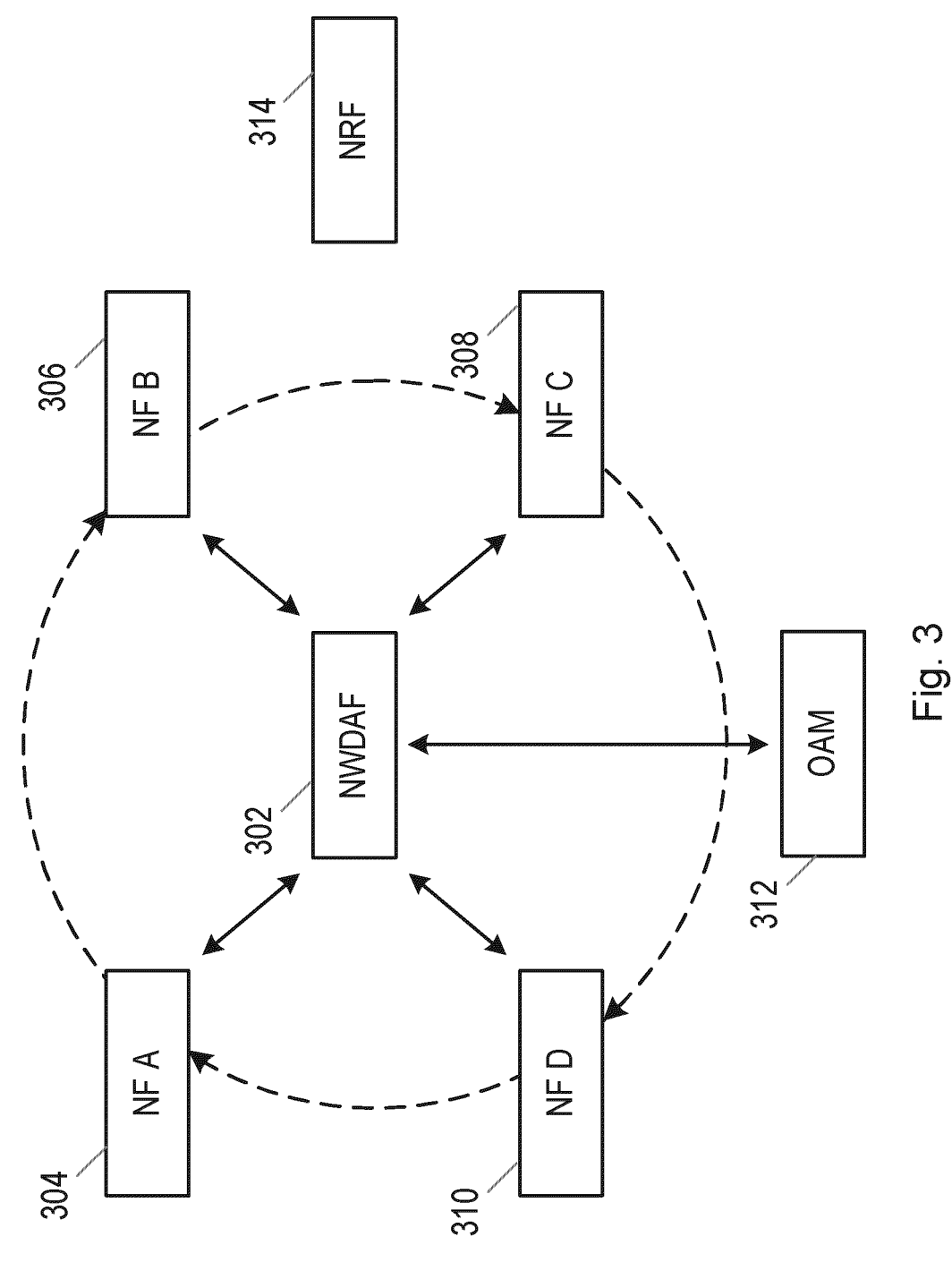
FIG. 3 shows a system according to embodiments of the disclosure.

FIG. 3 shows a system 300 according to embodiments of the disclosure, for performing collaborative learning, such as federated learning.

One or more entities of the system may, for example, form part of a core network in the communication network. The core network may be a Fifth Generation (5G) Core Network (5GCN). The communication network may implement any suitable communications protocol or technology, such as Global System for Mobile communication (GSM), Wide Code-Division Multiple Access (WCDMA), Long Term Evolution (LTE), New Radio (NR), WiFi, WiMAX, or Bluetooth wireless technologies. In one particular example, the network forms part of a cellular telecommunications network, such as the type developed by the $3^{rd}$ Generation Partnership Project (3GPP). Those skilled in the art will appreciate that the system 300 may comprise further components that are omitted from FIG. 3 for the purposes of clarity.

The system 300 comprises an aggregating entity 302, a plurality of network entities or network functions (NFs)—labelled NF A 304, NF B 306, NF C 308 and NF D 310—an operations, administration and maintenance node (OAM) 312 and a NF repository function (NRF) 314. The system 300 may be implemented in a communication network, such as a cellular network comprising a radio access network and a core network. Some of the entities may be, and particularly may be implemented in a core network of the communication network.

The system 300 comprises at least two network entities or NFs. In the illustrated embodiment, four network entities are shown, although the skilled person will appreciate that the system 300 may comprise fewer or many more network entities than shown. The network entities 304-310 are configured to provide one or more services. The network entities may be any type or combination of types of network entities or network functions. For example, one or more of the network entities 304-310 may comprise core network entities or functions such as an access and mobility management function (AMF), an authentication server function (AUSF), a session management function (SMF), a policy control function (PCF), and/or a unified data management (UDM) function. Alternatively or additionally, one or more of the network entities 304-310 may be implemented within entities outside the core network, such as radio access network nodes (e.g., base stations such as gNBs, eNBs etc or parts thereof, such as central units or distributed units). The network entities 304-310 may be implemented in hardware, software, or a combination of hardware and software.

Each of the network entities 304-310 is able to communicate with the NWDAF 302. Such communication may be direct, as shown in the illustrated embodiment, or indirect via one or more intermediate network nodes. Each of the network entities 304-310 is further able to communicate with at least one other of the network entities 304-310. In the illustrated embodiment, each network entity 304-310 transmits to a single other network entity, e.g., NF A 304 transmits to NF B 306, NF B 306 transmits to NF C 308, and so on. This leads to a "ring" configuration, as shown in the illustrated embodiment. Those skilled in the art will appreciate that such a term does not imply any limitations on the physical location (e.g., the geographical location) of the network entities 304, 310. Again, such communication between network entities 304-310 may be direct or indirect. In the latter case, transmissions between the network entities 304-310 may travel via the NWDAF 302 (e.g., in a hub-and-spoke configuration).

Each of the network entities 304-310 is registered at the network registration entity 314 that also forms part of the system 300. In this example, the network registration entity is a Network function Repository Function (NRF) 314. However, the skilled person will appreciate that the network registration entity may be any suitable network entity that provides registration and discovery for network entity services. The NRF 314 may thus store information for each of the network entities 304-310 registered there. The stored information may include one or more of: a type of each of the network entities 304-310; a network address (e.g., IP address) of the network entities; services provided by the network entities; and capabilities of the network entities. Thus, once registered at the NRF 314, the network entities 304-310 are discoverable by other entities in the network.

In one embodiment, the aggregating entity 302 is a network data analytics function (NWDAF). The NWDAF 302 is configured to collect network data from one or more network entities, and to provide network data analytics information to network entities which request or subscribe to receive it. For example, an NWDAF may provide information relating to network traffic or usage (e.g. predicted load information or statistics relating to historical load information). The network data analytics information provided by the NWDAF may, for example, be specific to the whole network, or to part of the network such as a network entity or a network slice. The network data analytics information provided by the NWDAF 308 may comprise forecasting data (e.g. an indication of a predicted load for a network function) and/or historical data (e.g. an average number of wireless devices in a cell in the communication network). The network data analytics information provided by the NWDAF may include, for example, performance information (e.g. a ratio of successful handovers to failed handovers, ratio of successful setups of Protocol Data Unit (PDU) Sessions to failed setups, a number of wireless devices in an area, an indication of resource usage etc.).

As described above, communication networks are becoming increasingly automated, with network designers seeking to minimise the level of human intervention required during operation. One way of achieving this is to use the data collected in communication networks to train models using machine-learning, and to use those models in the control of the communication network. As communication networks continue to obtain data during operation, the models can be updated and adapted to suit the needs of the network. However, as noted above, conventional methods for implementing machine-learning in communication networks require collating data for training models at one network entity. Collating these data at a single network entity, such as the NWDAF 308, can be slow and resource intensive and may be problematic if the data is sensitive in nature.

Aspects of the disclosure address these and other problems.

In one aspect, a collaborative (e.g. federated) learning process is used to train a model using machine-learning. Rather than collating training data for training the model at a single network entity, instances of the model are trained locally at multiple network functions to obtain local updates to parameters of the model at each network entity. The local model updates are collated at the aggregating entity (such as the NWDAF) 302 and combined to obtain a combined model update. In this way, data from across multiple entities in a communication network are used to train a model using machine-learning, whilst minimising resource overhead and reducing security risks.

Accordingly, in the system 300 illustrated in FIG. 3, the NWDAF 302 initiates training of a model using machine-learning at each of the network functions 304-310. For example, the NWDAF 302 may transmit a message to each of the network functions 304-310 instructing the network function to train a model using machine-learning. The message may comprise an initial copy or version of the model (e.g. a global copy that initially is common to each of the network functions 304-310), or each of the network functions 304-310 may be preconfigured with a copy of the model. In the latter case, the message may comprise an indicator of which model is to be trained. The message may specify a type of machine-learning algorithm to be used by the network entities. Alternatively, the network entities 304-310 may be preconfigured with the type of machine-learning algorithm to be used for a model.

On receipt of the message from the NWDAF 302, each network entity 304-310 trains the model by inputting training data into the machine-learning algorithm to obtain a local model update to values of one or more parameters of the model. The training data may be data that is unique to the network entity. For example, the training data may comprise data obtained from measurements performed by the network function and/or data collected by the network function from other network entities (e.g. data obtained from measurements performed by one or more other network entities). Thus, while each of the network entities 304-310 may begin training the same version of the model (e.g., the same values for all parameters), the differences in training data as well as other factors (such as different machine-learning algorithms employed by each network entity, different rates of learning, etc) result in each network entity generating a trained version of the model which is different from trained versions generated by other network entities.

Note that each trained version is for the same model; the model has the same architecture or structure, uses the same input data and has the same purpose. However, the precise values for parameters (e.g., weights) of the model will differ between trained versions from different network entities. Thus the local model updates are in general different from each other.

Each of the network entities 304-310 transmits its respective local model update to the NWDAF 302. The local model update may comprise updated values of the parameters of the model or the local model update may comprise an indication of a change in the values of the parameters of the model, e.g., differences between initial values for the parameters and updated values for the parameters after training. Here it will be understood that the term "initial" is used to convey values for the parameters prior to a round of training. The initial values may not be the first values for those parameters, and may also have been subject to one or more previous rounds of training.

Transmissions between the network entities 304-310 and the NWDAF 302 may be direct (e.g. the NWDAF 308 transmits directly to a network entity) or the transmissions may be via an intermediate network entity. For example, the transmission between the network functions 304-310 and the NWDAF 302 may be via an Operation, Administration and Management function (OAM) 312.

The NWDAF 302 thus receives the local model updates from each of the network entities 304-310. The NWDAF 302 combines the model updates received from the network entities 304-310 to obtain a combined model update. The NWDAF 302 may use any suitable operation for combining the model updates. For example, the NWDAF 302 may average the received local model updates to obtain an average model update. In a further example, the average may be a weighted average, with updates from different network entities being assigned different weights.

The NWDAF 302 transmits the combined model update to one or more network entities in the network. For example, the NWDAF 302 may send the combined model update to each of the network entities 304-310. In particular examples, the combined model update may be transmitted to one or more further network entities in addition to the network entities 304-310 used to train the model. The combined model update may comprise updated values of the parameters of the model or an indication of a change in the values of the parameters of the model, e.g., differences between previous values for the parameters and updated values for the parameters.

This process may be repeated one or more times. For example, the process may be repeated until the local model updates received from each of the network entities 304-310 are consistent with each other to within a predetermined degree of tolerance. In another example, the process may be repeated until the combined model updates converge, i.e. a combined model update is consistent with a previous combined model update to within a predetermined degree of tolerance.

Collaborative (e.g. federated) learning may thus be applied to communication networks (and in particular, to a core network in a communication network) to reduce latency, minimise resource overhead and reduce the risk of security problems.

Some aspects of the collaborative learning process described above inherently increase the security of data transmitted over the system 300. For example, security is improved by training local versions of the model at each of the network entities 304-310, as network data (i.e. the data on which the models are trained) is kept local to the respective network entities and not shared widely. Further, the data itself is not aggregated at a single entity, which would otherwise become an attractive point of attack for third parties seeking to gain access to that data. However, conventional collaborative learning, and particularly federated learning, entails the transmission of model updates across the network. A third party which intercepted such updates may be able to use those updates to infer information relating to the training data.

To address this and other problems, embodiments of the disclosure provide methods, apparatus and machine-readable media in which the model updates transmitted between the aggregator entity (e.g., the NWDAF 302) and the plurality of network entities 304-310 are subjected to a serialization function which removes all information relating to a structure or architecture of the model. In this way, while an intercepting entity may be able to gain knowledge as to the values of parameters of the model, it is unable to gain any practical insight into the nature of the model. Further, in some embodiments the aggregator entity 302 itself may not have knowledge of the model structure. This further increases security by reducing the opportunities for information relating to the model leaking into the public domain (e.g., from the aggregator entity), and also reduces the complexity of processing necessary to combine the multiple local model updates.

Figure 4:
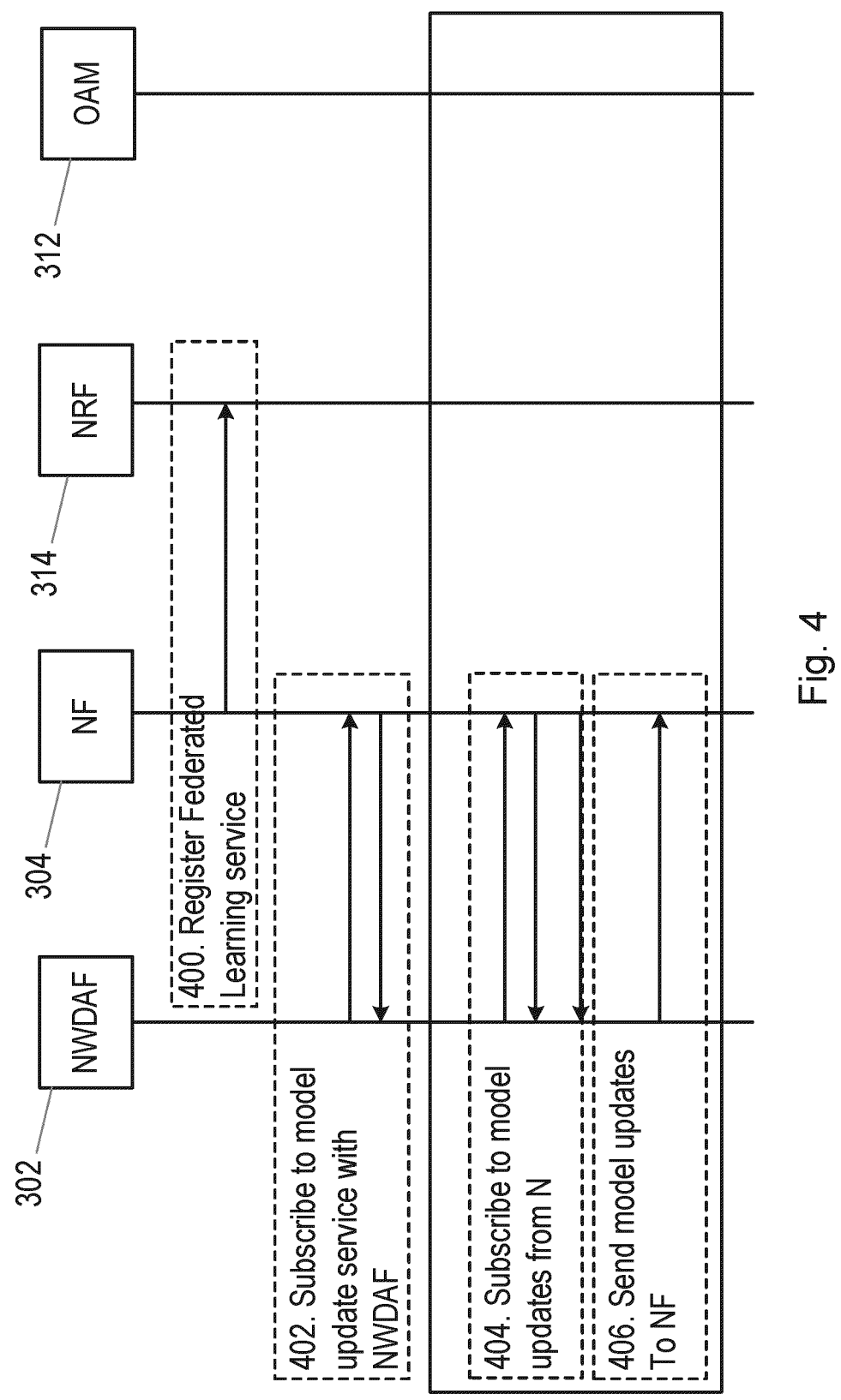
FIG. 4 is a process flow according to embodiments of the disclosure.

FIG. 4 is a process flow according to embodiments of the disclosure, which shows the overall scheme in which embodiments of the present disclosure may be implemented. The scheme involves an aggregating entity 302 (such as the NWDAF), a plurality of network entities or functions (of which one network entity 304 is illustrated) and a network registration entity NRF 314, and comprises four stages.

In the first stage 400, network entities or functions (such as the network entities 304-310) register with a registration entity (such as the NRF 314). The registration entity stores a profile in respect of each network entity, the profile comprising one or more of: a type of the network entity; one or more services which the network entity is capable of performing (such as collaborative learning, e.g., federated learning); and identity and/or addressing information for the network entity.

In the second stage 402, the network entity 304 subscribes to receive model updates from the aggregating entity (e.g., the NWDAF 302). Initial weights for the model may be sent from the aggregating entity to the network entity 304. The aggregating entity 302 may also provide the structure or architecture of the model to the network entities 304 in this stage. However, in alternative embodiments, a different network entity or function (such as the OAM 312 or another network entity) may transmit an indication of the structure or architecture of the model to the network entities 304. In this way, the aggregating entity 302 may never become aware of the model architecture.

In the third stage 404, the aggregating entity 302 selects network entities to participate in a collaborative (e.g., federated) learning process, and then subscribes to receive local model updates from the selected network entities. This stage may comprise the aggregating entity identifying the network entities through a discovery process (not illustrated) conducted with the NRF 314. For example, the aggregating entity 302 may transmit a request message to the NRF 314, comprising a request for the NRF 314 to return one or more candidate network entities which are capable of taking part in a collaborative learning process (e.g., based on the registrations in the first stage 400). Alternatively or additionally, the aggregating entity 302 may identify network entities from those network entities which subscribed to receive model updates in the second stage 402. In either case, the aggregating entity 302 may select all identified network entities to participate in the collaborative learning process, or may select a subset of the identified network entities based on one or more criteria. Such criteria may include one or more of: the performance of the network entities or the models trained thereby (e.g., as assessed by applying the model to a labelled dataset or similar); the availability of resources at the network entity to participate in the collaborative learning process; the location of the network entities (e.g., their proximity to the aggregating entity); the availability of adequate training data at the network entities, etc.

The aggregating entity 302 thus subscribes to receive local model updates from the selected network entities. In a first step, the aggregating entity 302 sends a subscription request message to the selected network entities. The subscription request message may comprise an indication of the model which the aggregating entity 302 is subscribing to (e.g., if the network entities are training more than one model). In a second step, the selected network entities 304 confirm receipt of the subscription request message, and may confirm that the subscription has been established. In a third step, the selected network entities 304 transmit local model updates to the aggregating entity 302. Further detail regarding this aspect is provided below with respect to FIG. 5. Transmission of the local model updates may be triggered upon detection of a timeout (e.g., expiry of a timer) or may be triggered by events (e.g., receipt of a request or an instruction).

In the fourth stage 406, the aggregating entity combines the received local model updates to obtain a combined model update. The aggregating entity may use any suitable operation for combining the model updates. For example, the aggregating entity may average the received local model updates to obtain an average model update. In a further example, the average may be a weighted average, with updates from different network entities being assigned different weights.

The aggregating entity may transmit the combined model update to one or more network entities in the network. For example, the aggregating entity may send the combined model update to each of the network entities 304-310. In particular examples, the combined model update may be transmitted to one or more further network entities in addition to the network entities 304-310 used to train the model.

Stages three and four 404, 406 may be repeated one or more times. For example, they may be repeated until the local model updates received from each of the network entities 304-310 are consistent with each other to within a predetermined degree of tolerance. In another example, the stages may be repeated until the combined model updates converge, i.e. a combined model update is consistent with a previous combined model update to within a predetermined degree of tolerance.

Collaborative (e.g. federated) learning may thus be applied to communication networks to reduce latency, minimise resource overhead and reduce the risk of security problems.

Figure 5:
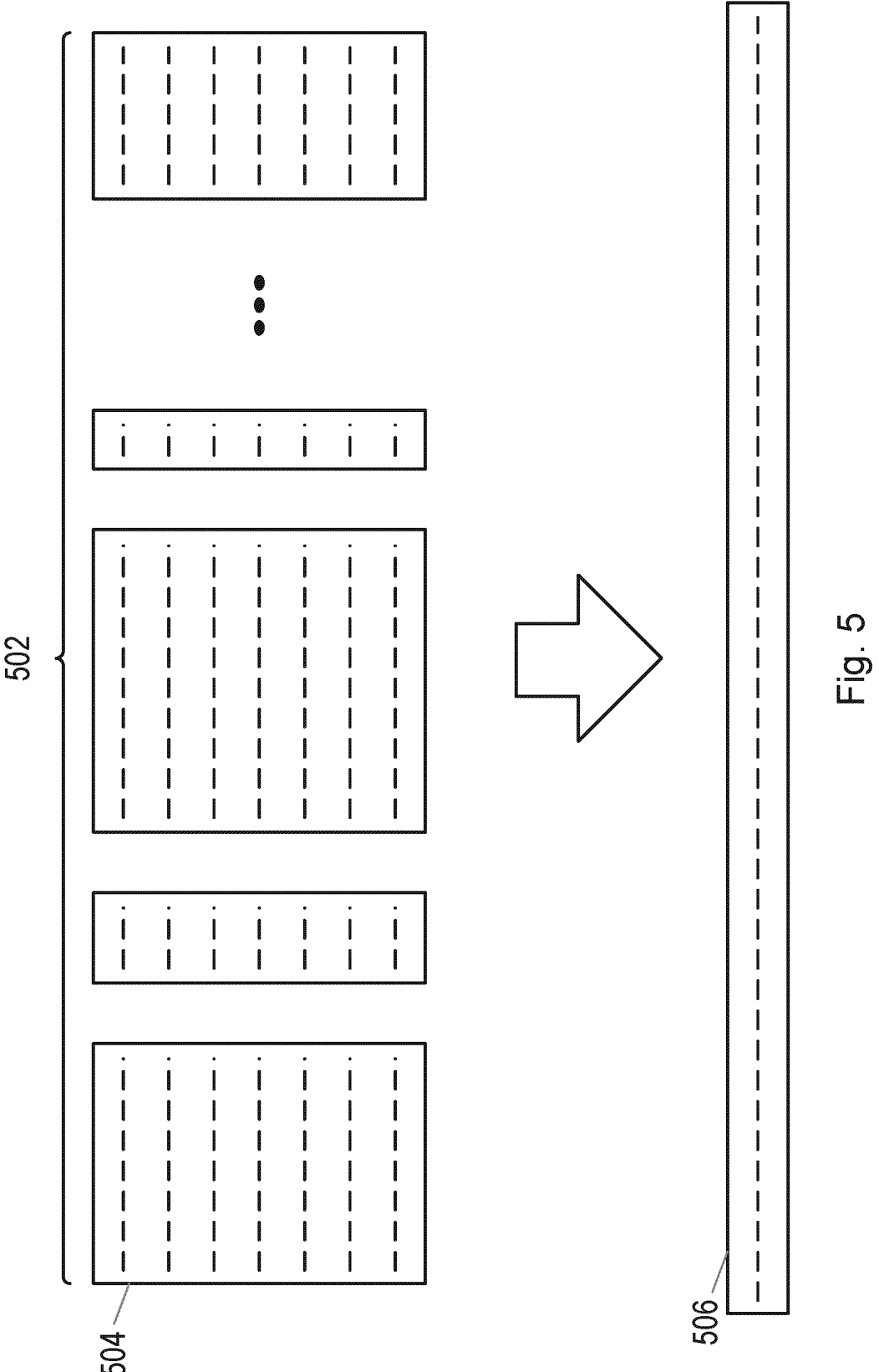
FIG. 5 shows a serialization function according to embodiments of the disclosure.

FIG. 5 is a schematic illustration of a serialization function according to embodiments of the disclosure.

The top half of the drawing shows an example of a model 502 including its architecture or structure. The bottom half of the drawings an example of a serialized representation 506 of the model, e.g., after application of a serialization function according to embodiments of the disclosure.

It can be seen that the un-serialized model 502 comprises one or more data structures 504, which may be called first data structures herein. For example, each first data structure 504 may comprise a matrix or a vector. Where the model comprises a plurality of layers (e.g., where the model is a neural network comprising a plurality of neural layers), each layer may comprise one or more first data structures 504. For example, each neural layer may comprise a two-dimensional matrix of neuron weights, and a vector of bias weights. A convolutional layer may comprise one or more n-dimensional arrays of weights (where n is a positive integer greater than 1) and a bias vector. Those skilled in the art will appreciate that models may in general comprise many different data structures having different sizes and numbers of dimensions. Further, the data structures may be nested within each other.

The un-serialized model 502 may comprise one or more functions, such as one or more of: activation functions and regularization functions.

In contrast, in the illustrated embodiment, the serialized representation of the model 506 comprises a single data structure which, in the illustrated embodiment, is a vector. The vector may be generated by reading out weights or other parameter values from the first data structures 504 sequentially (e.g., in a particular, defined sequence). The serialized representation 506 may not comprise the functions (such as activation functions and/or regularization functions) defined in the un-serialized model 502.

Thus, the serialized representation 506 of the model lacks any information regarding the structure or architecture of the un-serialized model. As noted above, in the illustrated embodiment, the serialized representation comprises a single vector; however, those skilled in the art will appreciate that many different serialization functions will effectively remove information regarding the structure or architecture of the un-serialized model. Thus the serialized representation 506 may in general comprise any number of data structures (called second data structures herein), provided that those second data structures differ from the first data structures 504 of the un-serialized model 502. For example, the serialized representation may comprise a different number of data structures; the second data structures may have a different size to the first data structures, or order; the second data structures may have a different number of dimensions to the first data structures; or any combination thereof.

Figure 6:
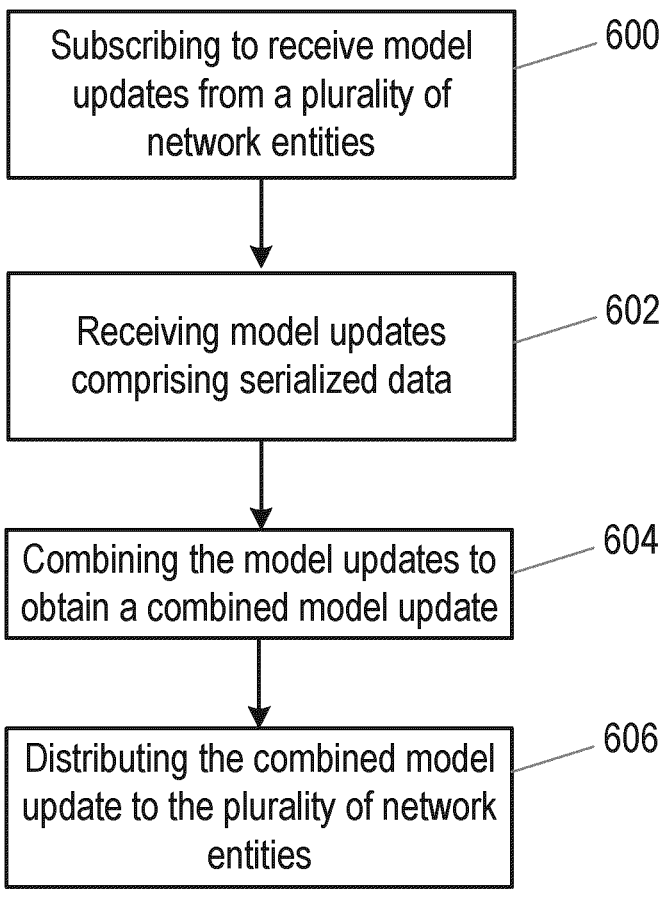
FIG. 6 is a flowchart of a method according to embodiments of the disclosure.

FIG. 6 is a flowchart of a method according to embodiments of the disclosure, for developing a model in a communication network. The method may be performed by an aggregating network entity, such as the aggregating entity described above with respect to FIGS. 3 and 4 (e.g., NWDAF 302). In one embodiment, the method provides further detail on the processing set out in FIG. 4.

The model may be used for various purposes. For example, the model may be a classifier model, trained to detect and classify certain datasets into classifications. For example, the classifier model may identify overload or other fault conditions in the network or parts thereof (e.g., one or more particular network nodes or network slices). The model may be a prediction model, trained to predict future outcomes based on current datasets. For example, the prediction model may predict future overload or other fault conditions in the network or parts thereof. The model may utilize input data relating to the functioning of the network. For example, the input data may comprise network performance statistics, such as the load being experienced by one or more network nodes or entities (e.g., the number of connected wireless devices, the amount of bandwidth being used by connected wireless devices, the number of services being utilized, etc), the radio conditions being experienced by connected wireless devices (e.g., reported values of signal-to-noise ratio, reference signal received strength or quality, packet drop rate, etc).

In step 600, the aggregating entity subscribes to receive model updates from one or more network entities which are training the model using a machine-learning algorithm.

In a first sub-step, the aggregating entity 302 sends a subscription request message to the network entities. The subscription request message may comprise an indication of the model which the aggregating entity 302 is subscribing to (e.g., if the network entities are training more than one model). In a second sub-step, the network entities 304 confirm receipt of the subscription request message, and may confirm that the subscription has been established.

In step 602, the aggregating entity receives local model updates from each of the network entities, following training of the model by the network entities using a machine-learning algorithm. As each network entity may utilize different training data as well as other factors (such as different machine-learning algorithms employed by each network entity, different rates of learning, etc), each network entity may generate a trained version of the model which is different from trained versions generated by other network entities. Each local model update comprises an update to values of one or more parameters of the model. The update may comprise the full values of those parameters (e.g., the full values for the trained version of the model), or differential values (e.g., the differences between the values for the trained version of the model and the values for the initial or preceding model). Here it will be understood that the term "initial" is not intended to be understood as relating to the first version of the model (although the first round of training may indeed relate to that first version), but rather to the previous values of the model before the current round of training.

According to embodiments of the disclosure, each of the local model updates comprises a serialized representation of the model, which lacks any information relating to a structure or architecture of the model. See the serialized representation 506 discussed above with respect to FIG. 5, for example. The serialized representation may further lack one or more functions such as activation functions and/or regularization functions.

In step 604, the aggregating entity combines the local model updates to obtain a combined model update. The aggregating entity may use any suitable operation for combining the local model updates. For example, the aggregating entity may sum the local model updates to obtain a summed model update. The aggregating entity may average the received local model updates to obtain an average model update (where the process of averaging comprising a summing step). In a further example, the average may be a weighted average, with updates from different network entities being assigned different weights. The precise combining operation may be determined by the aggregating entity, for example, based on a mapping (which may be preconfigured) between the particular model or service which the local model updates relate to. The service may be identified by a service ID or name provided with the local model updates.

In certain embodiments of the disclosure, the aggregating entity combines the local model updates in their serialized representations. It will be noted that this significantly reduces the complexity of the aggregation process, while also increasing the security of data (the model updates) which are shared between the network entities and the aggregating entity.

In step 606, the aggregating entity transmits the combined model update to one or more network entities. As with the local model updates, the combined model update may comprise full values for the updated version of the model or differential values from a previous or initial version of the model. The former embodiment reduces the amount of processing required at the network entities. The latter embodiments increases security further, by avoiding the transmission of full values for the model (which may be intercepted by third parties).

The aggregating entity may send the combined model update to each of the one or more network entities to which the aggregating entity subscribed to receive model updates in step 600. Alternatively or additionally, the aggregating entity may send the combined model update to any network entities which have subscribed to receive model updates from the aggregating entity. In particular examples, the combined model update may be transmitted to one or more further network entities in addition to the network entities used to train the model. For example, the combined model update may be transmitted to one or more network nodes or entities for implementation and use within the network.

The method set out in FIG. 6 may be repeated one or more times. For example, the method may be repeated until the local model updates received from each of the network entities are consistent with each other to within a predetermined degree of tolerance. In another example, the method may be repeated until the combined model updates converge, i.e. a combined model update is consistent with a previous combined model update to within a predetermined degree of tolerance.

FIG. 7 is a flowchart of a method according to embodiments of the disclosure. The method may be performed by a first network entity, such as one of the network entities or functions described above with respect to FIGS. 3 and 4 (e.g., NF A 304). In one embodiment, the method provides further detail on the processing set out in FIG. 4, and may also be read in conjunction with the complementary method set out in FIG. 6.

In step 700, the first network entity subscribes to receive combined model updates from an aggregating entity (e.g., NWDAF 302) for which the first network entity is training the model. For example, the first network entity may send a subscription request message to the aggregating entity. The subscription request message may comprise an indication of the model to which the first network entity is subscribing (e.g., if the aggregating entity is coordinating training of more than one model).

In step 702, the first network entity receives an indication of initial values for the parameters of the model. This indication may be received from the aggregating entity, for example, when the aggregating entity confirms receipt of the subscription request message, and/or that the subscription requested in step 700 has been established. Alternatively, the indication of initial values for the parameters of the model may be received from another network entity (e.g., OAM 312, any other network function or server).

The first network entity may also, in step 702, receive an indication of the model structure (or architecture). In one embodiment, the indication of the model structure is received from the aggregating entity itself in the same message as the indication of the initial values or a different message. In another embodiment, the indication of the model structure is received from another network entity (e.g., OAM 312, any other network function or server) which may be the same as, or different than the network entity from which the initial values were received. For example, an operator of the network entities may provide the model structure as part of a software update, or the network entities may download the model structure from a repository (e.g., triggered by the OAM 312, the network operator or another entity). Alternatively, the model structure may be pre-configured within each network entity. In a further alternative the model structure may be negotiated between the multiple network entities training the mode. For example, multiple candidate architectures may be defined (e.g., by the network operator or some other entity, as described above), with the network entities selecting a common architecture from the multiple candidate architectures. Each network entity may support training of only certain architectures. The network entities may thus negotiate with each other to determine the most complicated candidate architecture which is supported by all network entities, for example. Here it will be noted that the operator (e.g., owner, vendor, etc) of the network entities may be different from the operator of the aggregating entity. Thus the aggregating entity (e.g., NWDAF) may never gain knowledge of the model structure or the nature of the model (e.g., what its purpose is, what the input data is, etc).

In step 704, the first network entity obtains training data on which the model can be trained. The training data may be data that is unique to the first network entity. For example, the training data may comprise data obtained from measurements performed by the first network entity and/or data collected by the first network entity from other network entities (e.g. data obtained from measurements performed by one or more other network entities).

The training data may relate to the functioning of the network. For example, the training data may comprise network performance statistics, such as the load being experienced by one or more network nodes or entities (e.g., the number of connected wireless devices, the amount of bandwidth being used by connected wireless devices, the number of services being utilized, etc), the radio conditions being experienced by connected wireless devices (e.g., reported values of signal-to-noise ratio, reference signal received strength or quality, packet drop rate, etc).

In step 706, the first network entity trains the model (i.e. its local version of the model) by inputting the training data to a machine-learning algorithm and thus generates an update to the model. Embodiments of the disclosure relate to secure methods of sharing these model updates. Thus the particular machine-learning algorithm which is used is not relevant to a description of the disclosure. Those skilled in the art will appreciate that any machine-learning algorithm may be employed to train the model.

The local mode update may comprise new values for one or more parameters of the model (e.g., new weights for a neural network, etc), or changes to the values for one or more parameters of the model (e.g., differences between the initial or previous values and the trained values for those parameters).

In step 708, the first network entity applies a serialization function to the local model update to generate a serialized representation of the local model update. FIG. 5 provides a more detailed explanation of this function. According to embodiments of the disclosure the serialization function removes information which is indicative of a structure or architecture of the model.

In step 710, the serialized representation of the local model update is transmitted to the aggregating entity, where it is combined with other local model updates (see step 604 described above, for example).

At this point, the method may stop if further training of the model is not desired. However, if further training is required (e.g., if a stopping criterion has not been reached, such as local model updates from multiple network entities being consistent with each other, or combined model updates converging), the method proceeds to step 712.

In step 712, the first network entity receives a combined model update from the aggregating entity (see step 606 described above, for example). The combined model update may also be in a serialized representation, and therefore in step 714 the first network entity applies a de-serialization function (e.g., the inverse function of that applied in step 708) to recover a full update to the model including the structure thereof. The update may comprise the full values of those parameters (e.g., the full values for the trained version of the model), or differential values (e.g., the differences between the values for the trained version of the model and the values for the initial or preceding version of the model). In the latter case, the first network entity applies the differential values to the initial or preceding version of the model to obtain the updated version. The method then moves back to step 704, in which the first network entity obtains (further) training data and then proceeds to train the updated version of the model based on the further training data. Those skilled in the art will appreciate that the first network entity may continually be obtaining training data, rather than waiting for receipt of the combined model update.

Figure 8:
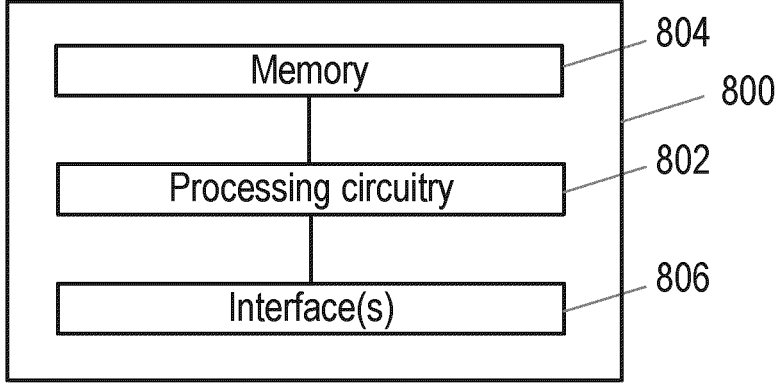
FIGS. 8 and 9 are schematic diagrams showing an aggregating entity according to embodiments of the disclosure.

FIG. 8 is a schematic block diagram of an apparatus 800 in a communication network (for example, the system 300 shown in FIG. 3). The apparatus may be implemented in an aggregating entity or function (such as the aggregating entity or NWDAF 302 described above with respect to FIG. 3). Apparatus 800 is operable to carry out the example method described with reference to FIG. 6 and possibly any other processes or methods disclosed herein. It is also to be understood that the method of FIG. 6 may not necessarily be carried out solely by apparatus 800. At least some operations of the method can be performed by one or more other entities.

The apparatus 800 may be operable in a communication network, which further comprises a plurality of network entities configured to perform collaborative learning to develop a model. Each network entity of the plurality of network entities stores a version of the model (e.g., a local version or copy), and trains the version of the model using a machine learning algorithm.

The apparatus 800 comprises processing circuitry 802, a non-transitory machine-readable medium (e.g., memory) 804 and, in the illustrated embodiment, one or more interfaces 806. In one embodiment, the non-transitory machine-readable medium 804 stores instructions which, when executed by the processing circuitry 802, cause the apparatus 800 to: receive, from each network entity in the plurality of network entities, a serial representation of a respective local model update comprising an update to values of one or more parameters of the model, wherein the serial representation lacks any information relating to a structure of the model; and combine the local model updates received from the plurality of network entities to obtain a combined model update.

In other embodiments, the processing circuitry 802 may be configured to directly perform the method, or to cause the apparatus 800 to perform the method, without executing instructions stored in the non-transitory machine-readable medium 804, e.g., through suitably programmed dedicated circuitry.

Figure 9:
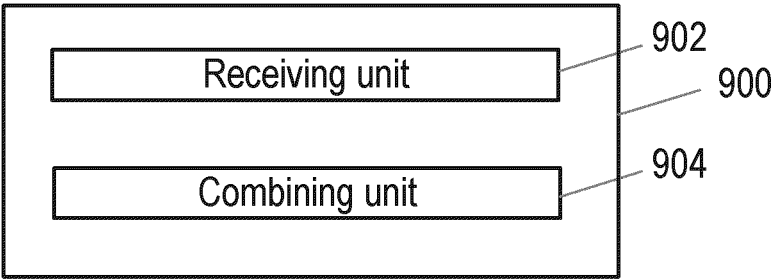

FIG. 9 illustrates a schematic block diagram of an apparatus 900 in a communication network (for example, the system 300 shown in FIG. 3). The apparatus may be implemented in an aggregating entity or function (such as the aggregating entity or NWDAF 302 described above with respect to FIG. 3). Apparatus 900 is operable to carry out the example method described with reference to FIG. 6 and possibly any other processes or methods disclosed herein. It is also to be understood that the method of FIG. 6 may not necessarily be carried out solely by apparatus 900. At least some operations of the method can be performed by one or more other entities.

Virtual Apparatus 900 may comprise processing circuitry, which may include one or more microprocessor or micro-controllers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 902 and combining unit 904, and any other suitable units of apparatus 900 to perform corresponding functions according one or more embodiments of the present disclosure.

The apparatus 900 may be operable in a communication network, which further comprises a plurality of network entities configured to perform collaborative learning to develop a model. Each network entity of the plurality of network entities stores a version of the model (e.g., a local version or copy), and trains the version of the model using a machine-learning algorithm.

As illustrated in FIG. 9, apparatus 900 includes receiving unit 902 and combining unit 904. Receiving unit 902 is configured to receive, from each network entity in the plurality of network entities, a serial representation of a respective local model update comprising an update to values of one or more parameters of the model. The serial representation lacks any information relating to a structure of the model. Combining unit 904 is configured to combine the local model updates received from the plurality of network entities to obtain a combined model update.

Both apparatuses 800 and 900 may additionally comprise power-supply circuitry (not illustrated) configured to supply the respective apparatus 800, 900 with power.

Figure 10:
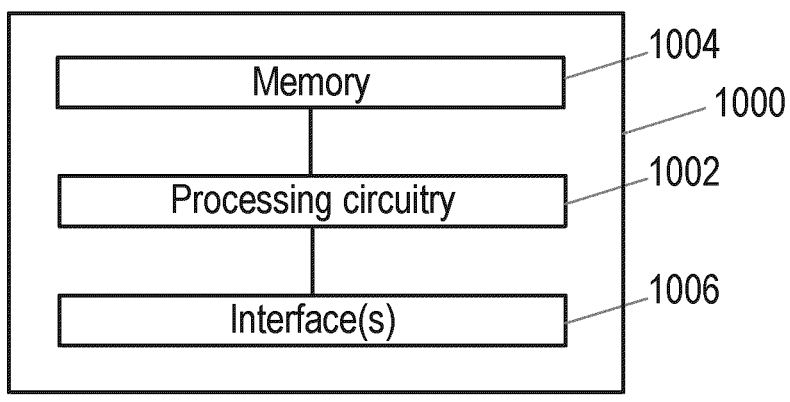
FIGS. 10 and 11 are schematic diagrams showing a network entity according to embodiments of the disclosure.

FIG. 10 is a schematic block diagram of an apparatus 1000 in a communication network (for example, the system 300 shown in FIG. 3). The apparatus may be implemented in a network entity or function (such as any of the network entities or functions 304-310 described above with respect to FIG. 3). Apparatus 1000 is operable to carry out the example method described with reference to FIG. 7 and possibly any other processes or methods disclosed herein. It is also to be understood that the method of FIG. 7 may not necessarily be carried out solely by apparatus 1000. At least some operations of the method can be performed by one or more other entities.

The apparatus 1000 comprises processing circuitry 1002, a non-transitory machine-readable medium (e.g., memory)

1004 and, in the illustrated embodiment, one or more interfaces 1006. In one embodiment, the non-transitory machine-readable medium 1004 stores instructions which, when executed by the processing circuitry 1002, cause the apparatus 1000 to: train a model to obtain a local model update comprising an update to values of one or more parameters of the model, wherein training the model comprises inputting training data into a machine learning algorithm; apply a serialisation function to the local model update to construct a serial representation of the updates to values of the one or more parameters of the model, thereby removing information indicative of a structure of the model; and transmit the serial representation of the local model update to an aggregator entity in the communications network.

In other embodiments, the processing circuitry 1002 may be configured to directly perform the method, or to cause the apparatus 1000 to perform the method, without executing instructions stored in the non-transitory machine-readable medium 1004, e.g., through suitably programmed dedicated circuitry.

Figure 11:
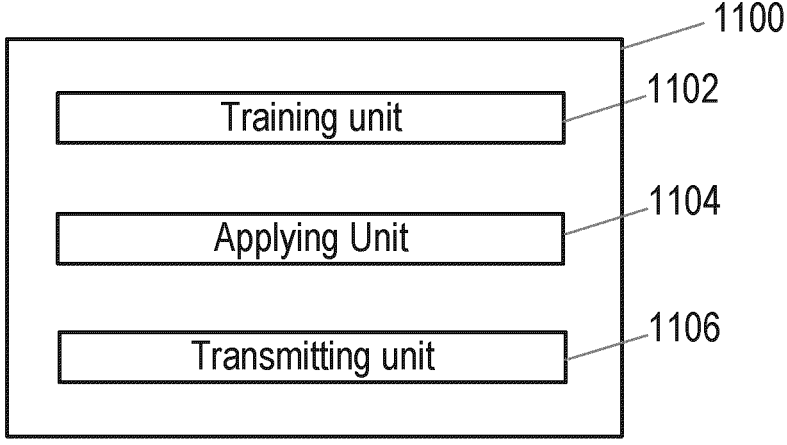

FIG. 11 illustrates a schematic block diagram of an apparatus 1100 in a communication network (for example, the system 300 shown in FIG. 3). The apparatus 1100 may be implemented in a network entity or function (such as any of the network entities or functions 304-310 described above with respect to FIG. 3). Apparatus 1100 is operable to carry out the example method described with reference to FIG. 7 and possibly any other processes or methods disclosed herein. It is also to be understood that the method of FIG. 7 may not necessarily be carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause training unit 1102, applying unit 1104 and transmitting unit 1106, and any other suitable units of apparatus 1100 to perform corresponding functions according one or more embodiments of the present disclosure.

As illustrated in FIG. 11, apparatus 1100 includes training unit 1102, applying unit 1104 and transmitting unit 1106. Training unit 1102 is configured to train a model to obtain a local model update comprising an update to values of one or more parameters of the model. Training the model comprises inputting training data into a machine learning algorithm. Applying unit 1104 is configured to apply a serialisation function to the local model update to construct a serial representation of the updates to values of the one or more parameters of the model, thereby removing information indicative of a structure of the model. Transmitting unit 1106 is configured to transmit the serial representation of the local model update to an aggregator entity in the communications network.

Both apparatuses 1000 and 1100 may additionally comprise power-supply circuitry (not illustrated) configured to supply the respective apparatus 1000, 1100 with power.

The embodiments described herein therefore allow for reducing processing complexity at the aggregating entity, minimising signalling overhead and reducing the risk of security problems when implementing machine-learning in communication networks. In particular, the embodiments described herein provide a secure method for sharing updates to a model developed using a collaborative learning process, thereby reducing the ability for third parties to gain access to the contents of the model and/or the data used to train the model.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The invention claimed is:

1. A method performed by a first network entity in a communications network, the method comprising:
    training a model to obtain a local model update comprising an update to values of one or more parameters of the model, wherein training the model comprises inputting training data into a machine learning algorithm;
    generating a serial representation of the local model update without information indicative of a structure of the model by applying a serialization function to the local model update; and
    transmitting the serial representation of the local model update to an aggregator entity in the communications network.

2. A first network entity for a communications network, the first network entity comprising:
    processing circuitry; and
    a memory coupled to the processing circuitry and having instructions stored therein that are executable by the processing circuitry to cause the first network entity to perform operations comprising:
        training a model to obtain a local model update comprising an update to values of one or more parameters of the model, wherein training the model comprises inputting training data into a machine learning algorithm;
        generating a serial representation of the local model update without information indicative of a structure of the model by applying a serialization function to the local model update; and
        transmitting the serial representation of the local model update to an aggregator entity in the communications network.

3. The first network entity of claim 2, the operations further comprising:
    receiving, from the aggregator entity, a combined model update, wherein the combined model update is based on the local model update and at least one additional local model update obtained by the aggregator entity from at least one second network entity in the communications network.

4. The first network entity of claim 3, wherein receiving the combined model update comprises receiving, from the aggregator entity, a serial representation of the combined model update.

5. The first network entity of claim 4, the operations further comprising:
    obtaining a second update to the values of the one or more parameters of the model by applying an inverse of the serialization function to the serial representation of the combined model update.

6. The first network entity of claim 3, wherein the combined model update comprises at least one of:
    differential values between an initial version of the model and an updated version of the model; and
    values for an updated version of the model.

7. The first network entity of claim 2, wherein the structure of the model comprises one or more first data structures having respective dimensions,
    wherein the serial representation comprises one or more second data structures having respective dimensions, and
    wherein dimensions of the second data structures are different to dimensions of the first data structures.

8. The first network entity of claim 7, wherein:
    the structure of the model comprises a first number of first data structures;
    the serial representation comprises a second number of second data structures that is different than the first number of first data structures;
    each of the first data structures corresponds to a layer of a neural network; and/or
    the first and second data structures comprise matrices.

9. The first network entity of claim 2, wherein the local model update comprises at least one of:
    differential values between an initial version of the model and a trained version of the model; and
    values for a trained version of the model.

10. The first network entity of claim 2, wherein the aggregating entity is implemented in a Network Data Analytics Function ("NWDAF").

11. A system in a communications network, the system comprising:
    an aggregator entity; and
    a plurality of network entities configured to perform operations comprising:
        training a model to obtain a local model update comprising an update to values of one or more parameters of the model, wherein training the model comprises inputting training data into a machine learning algorithm;
        generating a serial representation of the local model update without information indicative of a structure of the model by applying a serialization function to the local model update; and
        transmitting the serial representation of the local model update to the aggregator entity, wherein the aggregator entity is configured to combine the local model updates received from the plurality of network entities to obtain a combined model update.

12. The system of claim 11, the operations further comprising:

receiving, from the aggregator entity, a combined model update, wherein the combined model update is based on the local model update and at least one additional local model update obtained by the aggregator entity from at least one second network entity in the communications network, wherein receiving the combined model update comprises receiving, from the aggregator entity, a serial representation of the combined model update.

13. The method of claim 1, further comprising:

receiving, from the aggregator entity, a combined model update, wherein the combined model update is based on the local model update and at least one additional local model update obtained by the aggregator entity from at least one second network entity in the communications network.

14. The method of claim 13, wherein receiving the combined model update comprises receiving, from the aggregator entity, a serial representation of the combined model update.

15. The method of claim 14, further comprising:

obtaining a second update to the values of the one or more parameters of the model by applying an inverse of the serialization function to the serial representation of the combined model update.

16. The method of claim 13, wherein the combined model update comprises at least one of:

differential values between an initial version of the model and an updated version of the model; and values for an updated version of the model.

17. The method of claim 1, wherein the structure of the model comprises one or more first data structures having respective dimensions, wherein the serial representation comprises one or more second data structures having respective dimensions, and wherein dimensions of the second data structures are different to dimensions of the first data structures.

18. The method of claim 17, wherein:

the structure of the model comprises a first number of first data structures;

the serial representation comprises a second number of second data structures that is different than the first number of first data structures;

each of the first data structures corresponds to a layer of a neural network; and/or the first and second data structures comprise matrices.

19. The method of claim 1, wherein the local model update comprises at least one of:

differential values between an initial version of the model and a trained version of the model; and values for a trained version of the model.

20. The method of claim 1, wherein the aggregating entity is implemented in a Network Data Analytics Function ("NWDAF").

* * * * *